A. KULAKOWSKI.
FOOD CHOPPER.
APPLICATION FILED APR. 26, 1919.

1,367,402.

Patented Feb. 1, 1921.
5 SHEETS—SHEET 1.

Witnesses
Geo. E. Logan

Inventor
Adam Kulakowski
By Victor J. Evans
Attorney

A. KULAKOWSKI.
FOOD CHOPPER.
APPLICATION FILED APR. 26, 1919.

1,367,402.

Patented Feb. 1, 1921.
5 SHEETS—SHEET 2.

Witnesses
Geo. E. Logan

Inventor
Adam Kulakowski
By Victor J. Evans
Attorney

A. KULAKOWSKI.
FOOD CHOPPER.
APPLICATION FILED APR. 26, 1919.
1,367,402.
Patented Feb. 1, 1921.
5 SHEETS—SHEET 4.
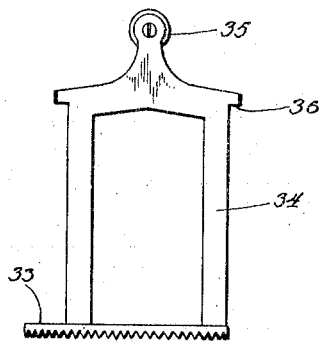
Fig. 8
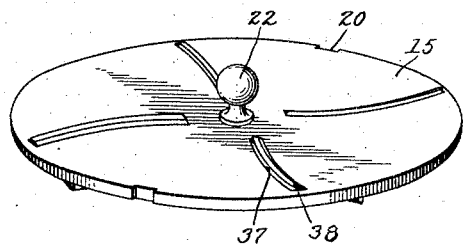
Fig. 9
Fig. 11
Fig. 10
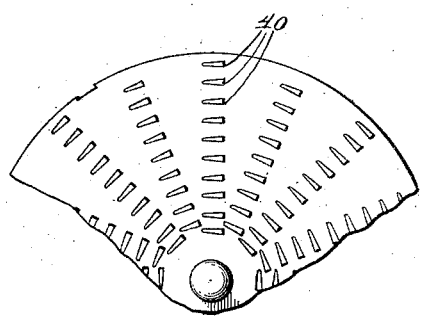
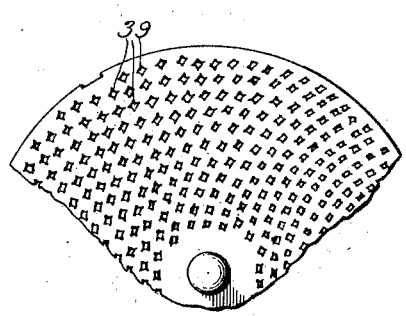
Witnesses
Geo. E. Logan
Inventor
Adam Kulakowski
By Victor J. Evans
Attorney

UNITED STATES PATENT OFFICE.

ADAM KULAKOWSKI, OF CINCINNATI, OHIO.

FOOD-CHOPPER.

1,367,402.      Specification of Letters Patent.      Patented Feb. 1, 1921.

Application filed April 26, 1919. Serial No. 292,773.

*To all whom it may concern:*

Be it known that I, ADAM KULAKOWSKI, a citizen of the United States, residing at Cincinnati, in the county of Hamilton and State of Ohio, have invented new and useful Improvements in Food-Choppers, of which the following is a specification.

This invention relates to means for cutting vegetables and other materials into small pieces and the principal object of the invention is to provide means whereby any one of a plurality of different kinds of cutting plates may be used with the device.

Another object of the invention is to make all the parts which come in contact with the materials readily detachable for cleansing purposes.

Still another object is to make the discharge member rotate with the cutter plate so as to facilitate the discharge of the cut material and to prevent the same from sticking on said member.

A further object is to provide means for forcing the material against the cutters.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 8 is an end view of a single form of presser;

Fig. 9 is a perspective view of one of the cutter plates;

Fig. 10 is a fragmentary view of another cutter plate;

Fig. 11 is a like view of still another form of plate;

Figure 1:
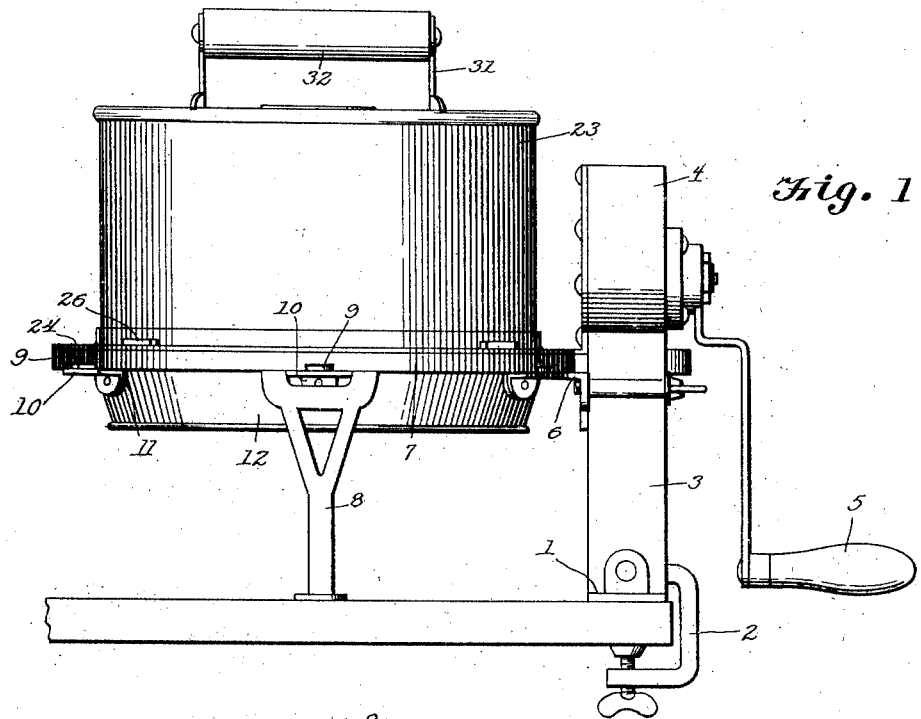
Figure 1 is a side view showing the device clamped to a table.
Figure 2:
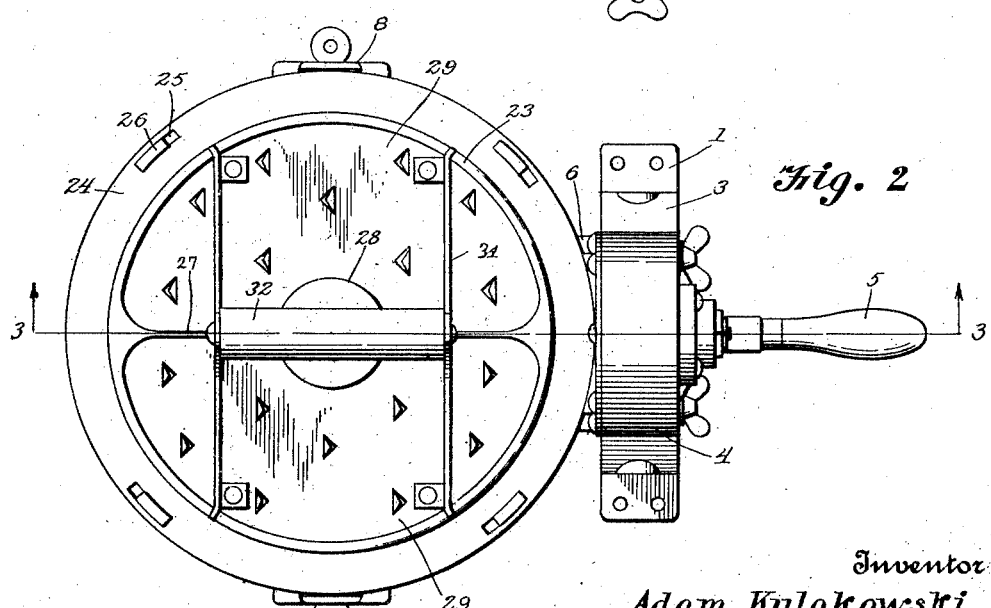
Fig. 2 is a plan view of the device.
Figure 3:
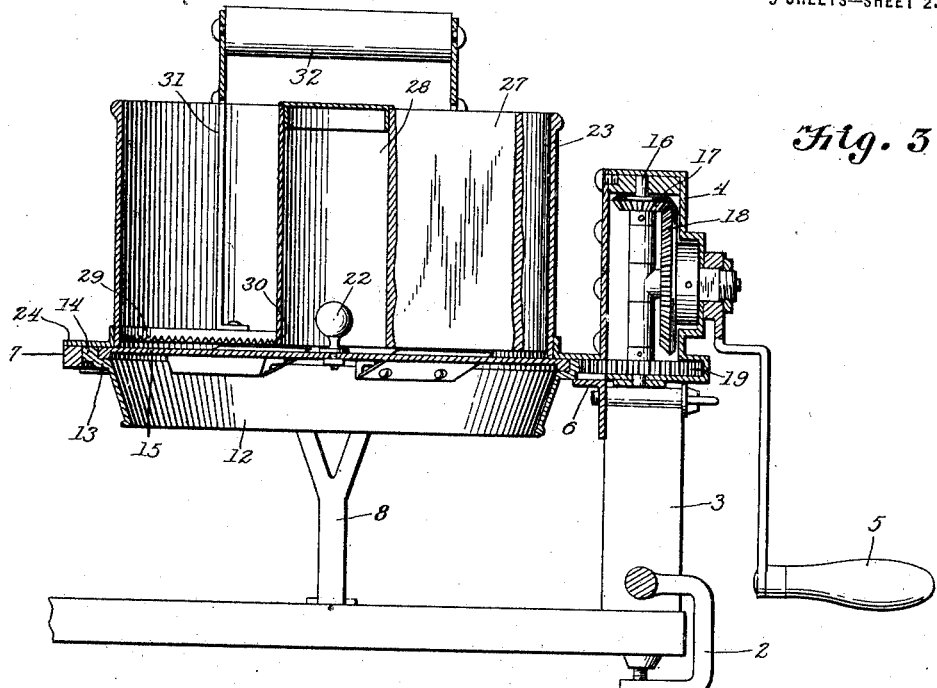
Fig. 3 is a vertical section on line 3—3 of Fig. 2.
Figure 4:
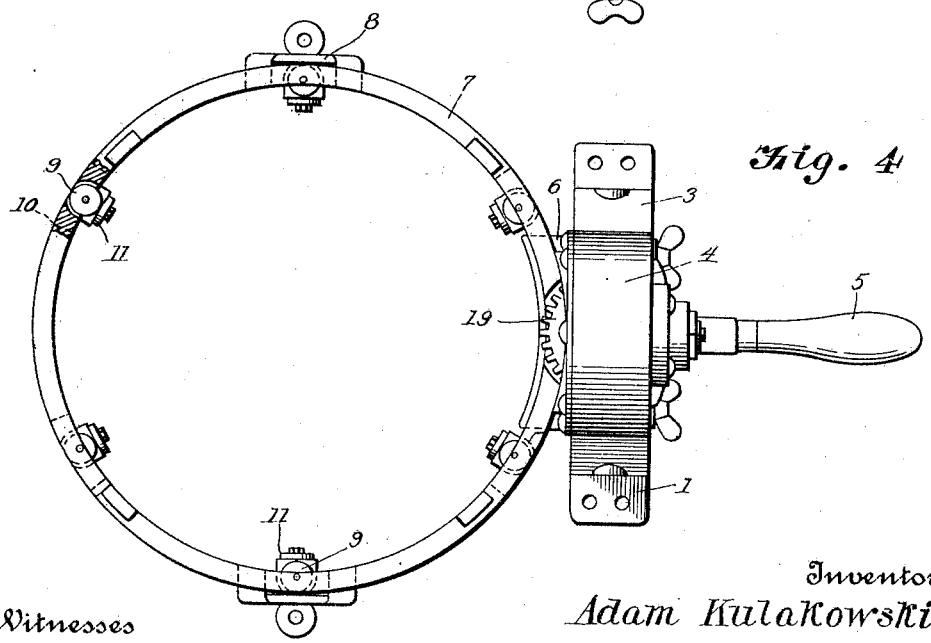
Fig. 4 is a plan view of the supporting ring and the operating means with the other parts removed.
Figure 5:
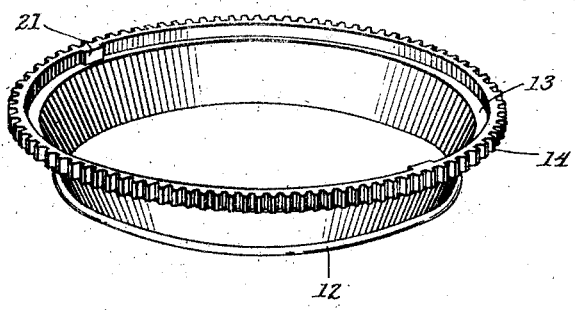
Fig. 5 is a perspective view of the discharge member with the circular rack thereon.
Figure 6:
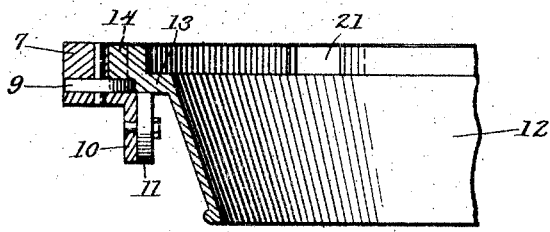
Fig. 6 is an enlarged sectional view through the discharge member and the supporting ring for showing the arrangement of the supporting rollers.
Figure 7:
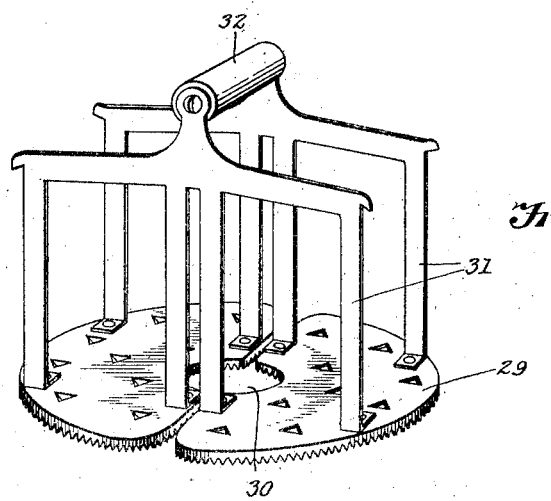
Fig. 7 is a perspective view of the double presser.

In these views 1 indicates the base of the device which may be clamped to a table or other support by the clamping member 2. An inverted U-shaped upright 3 is secured to the base and this upright supports the casing 4 for the operating means which are actuated by the handle 5. This upright also carries a shelf 6 which supports the spaced ends of a ring 7 which forms part of the supporting frame. This ring is supported from the base at diametrically arranged points by the legs 8. The ring is provided with a plurality of slots in its bottom and each slot receives a horizontally-arranged roller 9. An angle bracket 10 is located under each slot and these brackets are secured to the bottom edge of the ring and serve to support the lower end of the pivotal pin of the rollers. The other part of each bracket extends downwardly from the ring and receives a vertically-arranged roller 11. As will be seen, the horizontal rollers 9 project beyond the inner edge of the ring and the horizontal and vertical rollers are so arranged that the upper edge of the vertical roller is substantially in the same plane as the bottom face of the horizontal roller.

The discharge member 12 is of frustoconical form and is provided with the flange 13 at its upper end. Secured to this flange is an annular rack 14. This rack has its toothed portion projecting beyond the edge of the flange and the interior diameter of this rack is of such dimensions as to leave the inner part of the flange exposed so that said flange and the interior wall of the rack forms an annular recess to receive the plate 15 which carries the cutters. The discharge member fits within the supporting ring with the lower face of the flange resting on the vertical rollers and the edge of the flange engaging the horizontal rollers. This will place the rack within the ring and the upper face of said rack is slightly below the upper face of the ring.

A vertical shaft 16 is arranged in the casing 4 and the upper end of this shaft carries a beveled gear 17 which meshes with a gear 18 which is connected with the handle 5. A toothed wheel 19 is secured to the lower end of this shaft and this wheel is large enough to project into the space between the ends of the ring 7 so that it will engage the annular rack 14. In this way when the handle is turned the discharge member will be rotated on the rollers carried by the ring.

The cutter plate 15 is caused to move with the discharge member by reason of the fact that it is connected with said member by means of the notches 20 in said plate receiving the lugs 21 on the inner walls of the annular rack. The plate is provided with a centrally-arranged knob 22 for facilitating the removal and positioning of the plate on the discharge member.

A receptacle 23 of cylindrical form with both ends open, is arranged to be seated on the ring to hold the material to be operated upon by the knives. The lower end of this receptacle is provided with a flange 24 which has the slots 25 therein which are adapted to engage the undercut lugs 26 on the upper face of the ring 7. Thus by placing the receptacle in position with the slots engaging said lugs and then giving the receptacle a partial turning movement the said receptacle will be locked on the ring. The diameter of the receptacle is such that its walls and flange will cover the rack and the outer edge of the cutter plate when in position. The receptacle is divided into two chambers by a partition 27 and this partition is provided with a tubular middle portion 28 to fit over the knob 22 of the cutter plate.

It will thus be seen that when the parts are assembled and vegetables or other materials to be chopped are placed in the receptacle and the handle turned the plate upon which the vegetables rest will be rotated so as to bring the knives on said plate against the vegetables to slice pieces therefrom. These pieces will drop out of the discharge member into a receptacle placed under the same and on the base. The partition 27 will prevent the vegetables from rotating with the plate.

I sometimes find it desirable to press the vegetables upon the plate and to do this I provide a presser member which consists of a pair of semi-circular plates 29 spaced apart and provided with semi-circular recesses 30 to permit them to be passed into the chambers of the receptacle on each side of the partition. These plates are connected with the upright frames 31 and the upper ends of these frames are connected together by the handle bars 32. The upper part of the frame is provided with stops for limiting the downward movement of the plates so as to prevent said plates from coming in contact with the cutter plate. The plates have their under surfaces roughened such as by cutting the material of the plates and pressing the cut portions downwardly and by having their edges bent downwardly and provided with teeth. Thus the vegetables are firmly held by the plates and are prevented from rotating with the cutter plate.

When only one chamber of the receptacle is to be used I provide a presser composed of a single plate 33 which is connected to the frames 34 and said frames are connected together by the handle 35. Thus this presser may be placed in one or the other chamber of the receptacle. This frame is provided with the stops 36 for preventing the plate from engaging the top of the cutter plate. This form of presser is shown in Fig. 8.

The cutter plate shown in Fig. 9 is provided with the curved slots 37 through which the curved knives 38 project. These knives are adjustably secured to the lugs on the under side of the plate by screws or the like.

The plate shown in Fig. 10 is provided with a plurality of perforations 39 formed by using the punches on the inside of the plate. This will form projections around the perforations so that this plate will act to grate the vegetables. The plate shown in Fig. 11 has the openings 40 formed by holding the punch at an angle to the bottom of the plate so as to form small grooves leading to each opening and the opening is at the end of the grooves so that it is arranged at right angles to the face of the plate. This plate will cut the material operated upon into pieces.

Figure 12:
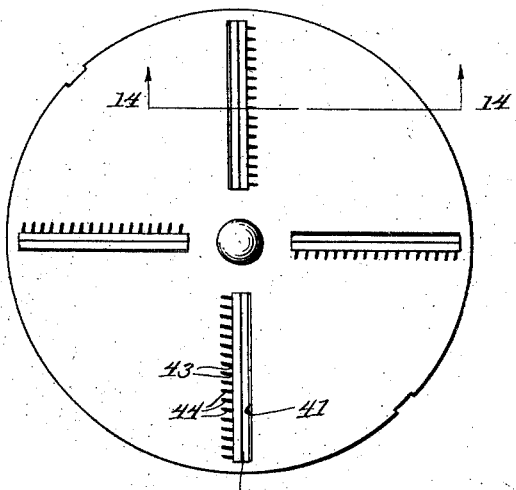
Fig. 12 is a top plan of another plate.
Figure 13:
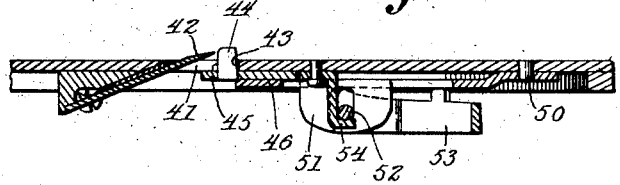
Fig. 13 is a bottom view of this plate.
Figure 14:
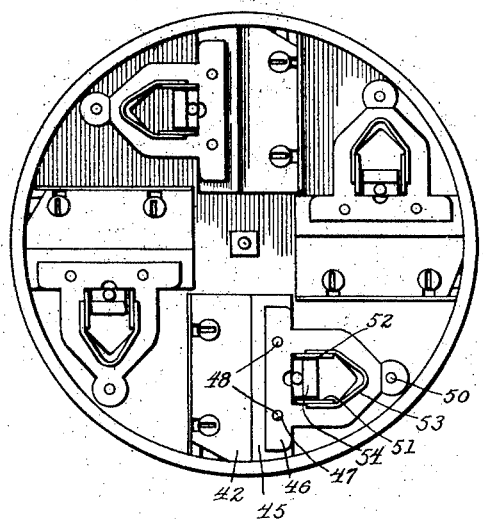
Fig. 14 is a section on line 14—14 of Fig. 12.

The plate shown in Figs. 12, 13 and 14 is provided with slots 41 for receiving the straight knives 42 which are adjustably secured to lugs on the under side of the plate. One wall of each slot has a plurality of parallel recesses 43 therein and these recesses are adapted to receive the vertically-arranged cutting fingers 44 which are carried by a plate 45 located on the under side of the cutter plate. This plate is removably held in position by means of a clamping plate 46 which is provided with the openings 47 which receive the pins 48 carried by the plate 45 and the pin 50 projecting from the under face of the cutter plate. The clamping plate is provided with the slotted ears 51 through the slots of which a pin 52 passes and this pin has secured thereto a U-shaped cam member 53. This pin 52 is adapted to engage an L-shaped lever 54 connected with the bottom of the cutter plate. In this way by operating the cam member the clamping plate may be pressed in clamping position to hold the finger-carrying plate in proper position. By swinging the cam member away from the cutter plate the clamping plate may be released and the finger plate removed. As will be seen the fingers project upwardly from the top face of the cutter plate immediately in front of the knife so that the strips of material cut by said knife are cut into small pieces by said fingers.

It will thus be seen that all the parts of the device may be easily and quickly separated for the purpose of cleaning the same and that one cutter plate may be removed and another substituted very easily. Attention is also called to the fact that the rollers and gears are all covered so that there is little danger of the same becoming clogged with the material.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A device of the class described comprising a ring shaped frame having split ends, uprights for supporting the frame, a shelf on one of said uprights for supporting the end portions of the ring frame, a casing supported on said upright, a vertical shaft in said casing, a gear on the lower end of said shaft and extending into the space between the split ends of the ring frame, manual means for rotating said shaft, a discharge member supported by the ring frame, an annular rack on said member adapted to be engaged by the gear, a cutter plate carried by said member and a receptacle located over the plate and resting upon the ring frame.

2. A device of the class described comprising a ring shaped frame, supporting means for the same, said frame having recesses in its bottom portion, horizontally arranged rollers in said recesses, brackets carried by said ring frame and having downwardly depending portions, vertically arranged rollers carried by said portions, a discharge member located within the frame and engaging said rollers, an annular rack on said member, a gear meshing with the rack, a shaft carrying the gear and supported by one of the uprights, manually operated means for rotating said shaft and a cutter plate carried by said member.

3. A device of the class described comprising a ring frame, uprights supporting the same, said frame having a plurality of recesses in its bottom, angle brackets secured to the bottom of the ring frame and covering said recesses, horizontally arranged rollers located in said recesses and having the lower ends of their axles supported in the brackets, vertically arranged rollers carried by the depending portions of the brackets, a discharge member located within the ring frame and engaging said rollers, a cutter plate carried by said member and a receptacle located over the plate and supported by the frame.

4. A device of the class described comprising a ring shaped frame, supporting means for the same, a discharge receptacle rotatably supported in said frame, means for rotating said receptacle, a removable plate carried by said receptacle, a centrally arranged handle on said cutter plate, a cylindrical receptacle located above the cutter plate and resting upon the ring frame and a partition in said cylindrical receptacle having a centrally arranged tubular portion surrounding the handle.

5. A device of the class described comprising a ring shaped frame, supporting means for the same, a discharge receptacle rotatably supported in said frame, means for rotating said receptacle, a removable plate carried by said receptacle, a centrally arranged handle on said cutter plate, a cylindrical receptacle located above the cutter plate and resting upon the ring frame, a partition in said cylindrical receptacle having a centrally arranged tubular portion surrounding the handle, and a pair of spaced presser plates for insertion in the cylindrical receptacle, one on each side of the partition and a handle connected with said plates, said plates having semi-circular recesses therein for receiving the tubular portion of the partition.

6. A device of the class described comprising a frame, a rotatable member therein, means for rotating said member, a cutter plate removably supported by said member, said cutter plate having slots therein, knives projecting through said slots, means for adjustably and detachably connecting the knives with the under part of said plate, said plate having a plurality of recesses extending at right angles from each slot, a plate, cutting fingers projecting upwardly therefrom and extending through said recesses, a clamping plate for clamping the finger carrying plate to the cutter plate and a cam lever for holding the clamping plate in clamping position.

In testimony whereof I affix my signature.

ADAM KULAKOWSKI.